L. G. FLEMING.
VEHICLE WHEEL.
APPLICATION FILED JUNE 19, 1909.

968,337.

Patented Aug. 23, 1910.

WITNESSES
Edward Thorpe
Redy Hoster

INVENTOR
Luke G. Fleming
BY Munn & Co
ATTORNEYS

UNITED STATES PATENT OFFICE.

LUKE GRENNAN FLEMING, OF TARRYTOWN, NEW YORK.

VEHICLE-WHEEL.

968,337.    Specification of Letters Patent.    Patented Aug. 23, 1910.

Application filed June 19, 1909. Serial No. 503,169.

*To all whom it may concern:*

Be it known that I, LUKE GRENNAN FLEMING, a citizen of the United States, and a resident of Tarrytown, in the county of Westchester and State of New York, have invented a new and Improved Vehicle-Wheel, of which the following is a full, clear, and exact description.

The invention relates to automobiles and other power-driven vehicles, and its object is to provide a new and improved vehicle wheel arranged to readily absorb shocks by the use of a yielding suspension between the center and the tire of the wheel, at the same time providing the desired rigidity in a transverse direction as well as in the line of travel of the vehicle, either forward or backward, to prevent wabbling of the wheel.

A practical embodiment of the invention is represented in the accompanying drawings forming a part of this specification, in which similar characters of reference indicate corresponding parts in both views.

Figure 1:
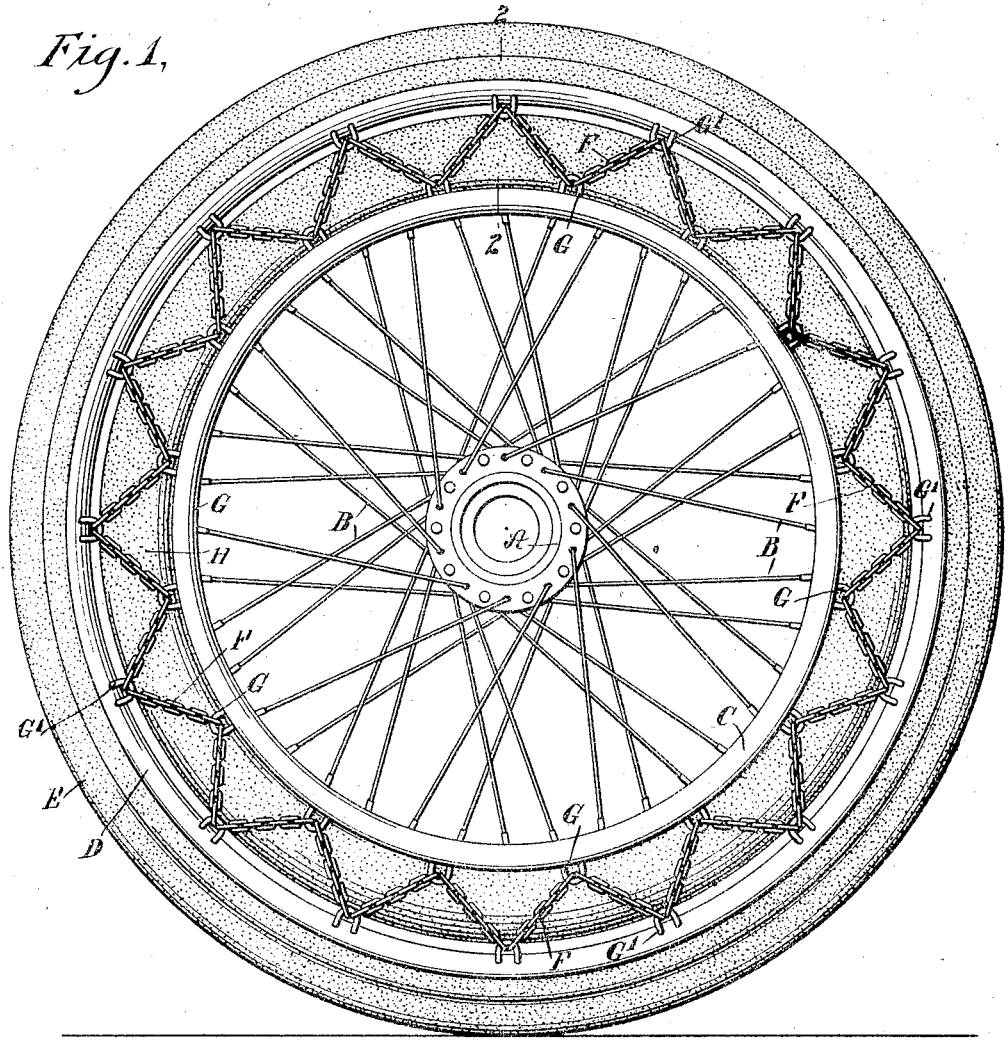
Figure 2:
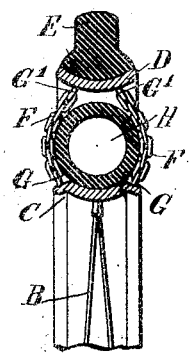

Figure 1 is a side elevation of the wheel; and Fig. 2 is a transverse section of the same, on the line 2—2 of Fig. 1.

The hub A of the vehicle wheel shown in the drawings is connected by spokes B with a ring C, the said hub, spokes and ring forming the center of the wheel. The ring C is flexibly connected with the rim D, provided with a rubber or other tire E of any approved construction, and in order to flexibly connect the ring C with the rim D, use is made of chains F, connected with staples G and G' or like devices, arranged alternately on the ring C and the rim D on both faces of the wheel, as will be readily understood by reference to Fig. 2. By the arrangement described, the chains on each face of the wheel form an open zigzag connection between the ring C and the rim D, and the chains on opposite faces of the wheel converge from the ring C toward the rim D, as indicated in Fig. 2.

Between the chains on the opposite faces of the wheel extends a cushion H, preferably in the form of an inflatable rubber tube, the cushion bulging the chains F outward in a transverse direction, as plainly shown in Fig. 2, to hold the chains normally against straightening out.

It is understood that any shock given to the tire E and its rim D, on the tire striking an obstruction in the road, tends to straighten out the chains F, as the latter are bulged outwardly in a transverse direction by the cushion H, and hence the cushion H keeps the chains F taut in the bulged out position, so that the cushion absorbs the shock and the latter does not reach the axle unless the chains F were wholly straightened out.

As shown in the drawings, the cushion H is preferably mounted on the ring C and is somewhat spaced from the rim D. Now by the arrangement described a yielding suspension is had between the center and the tire of the wheel, and by arranging the chains F in the manner described the desired rigidity is had in a transverse direction as well as in the line of the travel of the vehicle, either forward or backward, to prevent the wheel from wabbling.

Having thus described my invention, I claim as new and desire to secure by Letters Patent:

A vehicle wheel, comprising a wheel center, a rim, a flexible connection between the said wheel center and rim and capable of straightening out in the direction of the plane of the wheel, and a cushion engaging the said flexible connection to normally hold the same against straightening, the said flexible connection and cushion being arranged to provide rigidity in a transverse direction and in the direction of the travel of the wheel, to prevent the latter from wabbling.

In testimony whereof I have signed my name to this specification in the presence of two subscribing witnesses.

LUKE GRENNAN FLEMING.

Witnesses:
C. A. CALEW,
R. D. MACMAHON.